(12) United States Patent
Shioguchi

(10) Patent No.: US 12,203,771 B2
(45) Date of Patent: Jan. 21, 2025

(54) INFORMATION PROCESSING DEVICE AND NON-TRANSITORY, COMPUTER-READABLE MEDIUM THEREFOR

(71) Applicant: Faurecia Clarion Electronics Co., Ltd., Saitama (JP)

(72) Inventor: Takuma Shioguchi, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 18/307,544

(22) Filed: Apr. 26, 2023

(65) Prior Publication Data

US 2023/0349712 A1 Nov. 2, 2023

(30) Foreign Application Priority Data

Apr. 27, 2022 (JP) .................................. 2022-073749

(51) Int. Cl.
*G01C 21/36* (2006.01)
*G06F 3/04886* (2022.01)

(52) U.S. Cl.
CPC ..... *G01C 21/3664* (2013.01); *G06F 3/04886* (2013.01)

(58) Field of Classification Search
CPC . G06F 2203/04806; G06F 2203/04807; G06F 3/04842; G06F 3/04845; G06F 3/04883; G06F 3/04886; G01C 21/3664
See application file for complete search history.

(56) References Cited

U.S. PATENT DOCUMENTS

| | | | |
|---|---|---|---|
| 5,757,371 A | 5/1998 | Oran et al. | |
| 9,121,725 B2 | 9/2015 | Suzuki | |
| 9,213,467 B2 * | 12/2015 | Li | G06F 3/0482 |
| 10,019,133 B1 * | 7/2018 | McNeill | H04L 51/56 |

(Continued)

FOREIGN PATENT DOCUMENTS

| | | |
|---|---|---|
| JP | 2008304324 A | 12/2008 |
| WO | WO-2019181928 A1 * | 9/2019 |

OTHER PUBLICATIONS

"A new function for measuring distance by a circle is added to an application name MAPION map", One Compath, dated Mar. 4, 202, 6 pages.

(Continued)

*Primary Examiner* — Kenneth Bukowski
(74) *Attorney, Agent, or Firm* — REISING ETHINGTON P.C.

(57) ABSTRACT

An information processing device that is configured to include: a function allocating unit that allocates a first function to a first peripheral area inside a screen along a first side of the screen and allocates a second function to a second peripheral area inside the screen along a second side of the screen; a touch detection unit that detects touch operation of a user on the screen; and a function executing unit that upon detection of a slide operation from outside the peripheral area to inside the peripheral area, implements functions allocated to peripheral areas that are the slide operation destination based on the touch operation in the peripheral area that is the destination of the detected touch operation.

7 Claims, 12 Drawing Sheets

(56) References Cited

U.S. PATENT DOCUMENTS

| | | | | |
|---|---|---|---|---|
| 2002/0015064 A1* | 2/2002 | Robotham | .......... | G06F 3/04883 |
| | | | | 715/863 |
| 2003/0007135 A1* | 1/2003 | Sciammarella | ........ | G03B 21/28 |
| | | | | 353/98 |
| 2008/0250349 A1* | 10/2008 | Peiro | ..................... | G06F 3/0482 |
| | | | | 715/810 |
| 2009/0055094 A1 | 2/2009 | Suzuki | | |
| 2010/0073329 A1* | 3/2010 | Raman | .................... | G06F 3/167 |
| | | | | 345/177 |
| 2014/0068518 A1* | 3/2014 | Liu | ......................... | G06F 9/451 |
| | | | | 715/835 |
| 2015/0089407 A1* | 3/2015 | Suzuki | ............... | G06F 3/04842 |
| | | | | 715/834 |
| 2015/0227308 A1* | 8/2015 | Kim | ...................... | G06F 3/0483 |
| | | | | 715/769 |
| 2016/0018984 A1 | 1/2016 | Choi et al. | | |
| 2016/0286036 A1* | 9/2016 | Floury | ................ | G06F 3/04842 |
| 2018/0121048 A1* | 5/2018 | Tamura | ............... | G06F 3/04883 |
| 2021/0223920 A1* | 7/2021 | Xu | ........................ | G06F 3/0486 |

OTHER PUBLICATIONS

"A new function for measuring distance by a circle is added to an application named MAPION map", One Compath, dated Mar. 4, 2021, 6 pages; retrieved from https://onecompath.com/news/notice/8928/ on Apr. 12, 2023.

* cited by examiner

INFORMATION PROCESSING DEVICE AND NON-TRANSITORY, COMPUTER-READABLE MEDIUM THEREFOR

TECHNICAL FIELD

The present invention relates to an information processing device and to a program.

BACKGROUND

An information processing device that executes functions implemented in programs according to user operation is known. For example, JP2008-304324A describes an information processing device of this type that sets a search range on a map in response to a touch operation.

SUMMARY

There may be a case where the user performs a touch operation on the information processing device without looking at the screen. In this case, since the accuracy of the touch operation is low, an erroneous operation may occur, and a function not intended by the user may be executed.

In light of the circumstances described above, an object of the present invention is to provide an information processing device and a program where erroneous touch operations occur less readily.

An information processing device according to an embodiment of the present invention includes:
- a function allocating unit that allocates a first function to a first peripheral area inside a screen along a first side of the screen and allocates a second function to a second peripheral area inside the screen along a second side of the screen;
- a touch detection unit that detects touch operation of a user on the screen; and
- a function executing unit that upon detection of a slide operation from outside the peripheral area to inside the peripheral area, implements functions allocated to peripheral areas that are the slide operation destination based on the touch operation in the peripheral area that is the destination of the detected touch operation.

One embodiment of the present invention provides an information processing device and a program in which erroneous touch operations are less likely to occur.

DETAILED DESCRIPTION OF EMBODIMENTS

An information processing device and computer program stored on a non-transitory, computer-readable medium according to an embodiment of the present invention will be described below.

An information processing device according to an embodiment of the present invention is, for example, an on-vehicle device including a navigation device. In addition, the information processing device is not limited to the on-vehicle device, and may be other forms such as smartphones, feature phones, tablet terminals, Personal Computers (PCs), Personal Digital Assistants (PDAs), Portable Navigation Devices (PNDs), handheld game devices, and the like.

Figure 1:
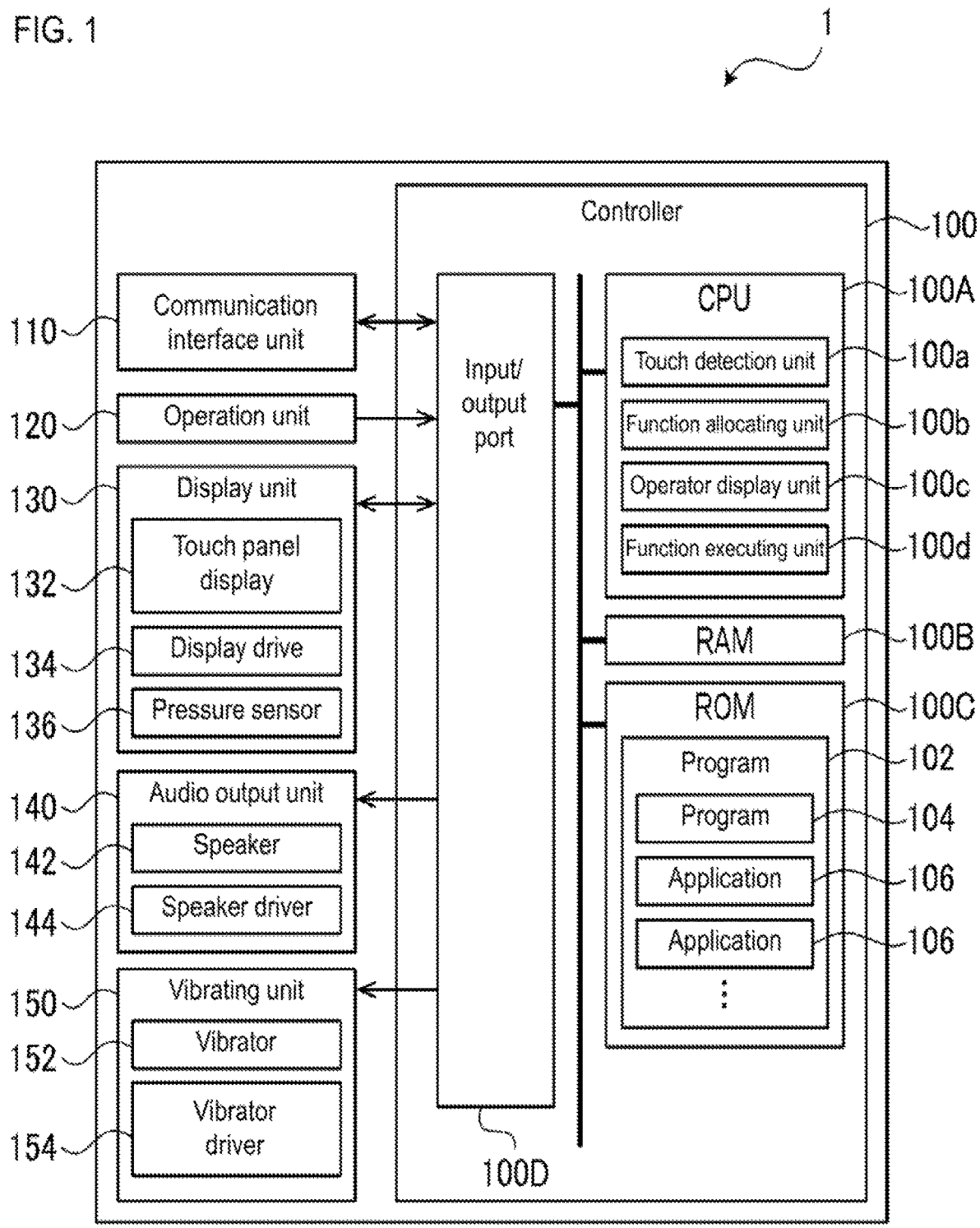
FIG. 1 is a block diagram showing a configuration of an information processing device according to an embodiment of the present invention.

FIG. 1 is a block diagram showing a configuration of an information processing device 1 according to an embodiment of the present invention. As shown in FIG. 1, the information processing device 1 includes a controller 100, a communication interface unit 110, an operation unit 120, a display unit 130, an audio output unit 140, and a vibrating unit 150. Note that FIG. 1 shows the main structural elements necessary for describing the present embodiment, and some structural elements such as a housing, which is an essential structural element of the information processing device 1, are not shown as appropriate.

The controller 100 provides overall control for the information processing device 1 and is a microcomputer composed of a CPU 100A, Random Access Memory (RAM) 100B, Read Only Memory (ROM) 100C, input/output ports 100D, a bus line that connects these ports, and the like.

The CPU 100A reads a computer program 102 stored in the ROM 100C and controls the information processing device 1 according to the program 102 thus read. The CPU 100A includes, as functional blocks, a touch detection unit 100a, a function allocating unit 100b, an operator display unit 100c, and a function executing unit 100d.

The CPU 100A that is an example of an electronic processor is, for example, a single processor or multiprocessor, and includes at least one processor. In a configuration containing a plurality of processors, the controller 100 including the CPU 100A may be packaged as a single device or may be configured as a plurality of physically separated devices within the information processing device 1.

The RAM 100B is a storage unit that temporarily stores programs and data, and provides a work area. The RAM 1008 is, for example, Dynamic Random Access Memory (DRAM)

The ROM 100C is non-volatile memory (also known as a non-transitory, computer readable medium) that stores various programs including the program 102 and data. The ROM 100C is, for example, flash memory.

The program 102 includes program 104 and a plurality of applications 106. The program 104 is, for example, an Operating System (OS) or middleware positioned in an intermediate layer between the OS and the application 106. In other words, the application 106 is higher layer software than the program 104 and operates on the program 104.

The plurality of applications 106 include, for example, a navigation application that provides route guidance to a destination, a camera application that displays a bird's-eye view of the vehicle when parking, a 3D viewer application that displays a 3D model of the vehicle, an audio application for operating an audio function equipped in the on-vehicle device including the navigation device, and an air conditioner control application for performing temperature adjustment and air flow adjustment of the air conditioner equipped on the vehicle.

For example, when a trigger signal is detected, the application 106 operating in the program 104 is switched. As an example, when the gear shift is switched to reverse while the navigation application is running, the program 102 switches the application 106 running on the program 104 from the navigation application to the camera application.

In this manner, the information processing device 1 is configured to switch between and execute a plurality of applications 106.

A program 102, including a program 104 and an application 106, allocates a first function to a first peripheral area within the screen along a first side of the screen, allocates a second function to a second peripheral area inside the screen along a second side of the screen, detects user touch operation on the screen, and when slide operation from outside a peripheral area into a peripheral area is detected, a function allocated to the peripheral area slid to is executed based on the detected touch operation into the slid to peripheral area, and is a program that is executed on the CPU 100A that is an example of a computer. By executing the program 102, an operating environment is provided in which erroneous operations occur less readily even when, for example, the user performs a touch operation without paying attention to the screen. Details of the program 102 will be described below.

In the present embodiment, each functional block of the CPU 100A is implemented by a program 102, which is software. Note that each functional block of the CPU 100A may be partially or wholly implemented by hardware such as a dedicated logic circuit.

The input/output port 100D connects the controller 100 with other structural elements (specifically, the communication interface unit 110, the operation unit 120, the display unit 130, the audio output unit 140, and the vibrating unit 150).

The communication interface unit 110 is an interface that performs communication processing with other terminal devices. The information processing device 1 is connected to other terminal devices via a communication line of a public line or a closed network such as a VPN (Virtual Private Network) by a communication interface unit 110, enabling two-way communication.

The operation unit 120 is an operation member such as a button or switch for the user to operate the information processing device 1.

The display unit 130 has a touch panel display 132 and a display driver 134 that drives the touch panel display 132. The touch panel display 132 is configured so that the entire screen can be touch-operated. Note that the "touch panel display" may be simply called a "touch panel", or may be called a "touch screen" or a "touch screen."

The touch panel display 132 includes, for example, Liquid Crystal Display (LCD) or organic Electro Luminescence (EL). The touch panel display 132 employs, for example, a resistive film system, a capacitance system, an ultrasonic surface elastic wave system, an infrared optical imaging system, or an electromagnetic induction system. The touch panel display 132 incorporates a pressure sensor 136 that senses the pressure of touching the screen (in other words, a touch-operable area).

The audio output unit 140 has a speaker 142 and a speaker driver 144 that drives the speaker 142. By driving the speaker 142 using the speaker driver 144, for example, navigation audio stored in the ROM 100C or storage media (not shown), (such as HDD (Hard Disk Drive), SSD (Solid State Drive), detachable memory card, or the like) is output from the speaker 142.

The vibrating unit 150 has a vibrator 152 and a vibrator driver 154 that drives the vibrator 152. The vibrator 152 is composed of, for example, an Eccentric Rotating Mass (ERM), a Linear Resonant Actuator (LRA), or piezo. By driving the vibrator 152 using the vibrator driver 154, the screen of the touch panel display 132 vibrates.

FIG. 2A to FIG. 2D are diagrams showing examples of images displayed on a screen 138 of the touch panel display 132 when running the navigation application. The entire screen 138 is configured to be touch operable.

Note that each drawing showing an image display example includes, as necessary, a hand icon indicating that the user has touched the screen 138. The fingertip position of this icon is the touch position TP of the user on the screen 138.

The CPU 100A detects the touch position TP of the user on the screen 138 and acquires the detected touch position TP as two-dimensional X and Y coordinate information. In other words, the CPU 100A running the program 102 operates as the touch detection unit 100a that detects touch operation of the user on the screen 138.

The horizontal direction of the screen 138 corresponds to a X direction, and the vertical direction of the screen 138 corresponds to a Y direction. When the center of the screen 138 is the origin, the direction indicated by the arrow indicating X (in other words, the direction to the right of the screen 138) is the positive X direction, and the opposite direction to the positive X direction (in other words, the direction to the left of the screen 138) is the negative X direction. The direction indicated by the arrow indicating Y (in other words, the upward direction of the screen 138) is the positive Y direction, and the opposite direction to the positive Y direction (in other words, the downward direction of the screen 138) is the negative Y direction. The X direction and the Y direction are orthogonal to each other.

Figure 2A:
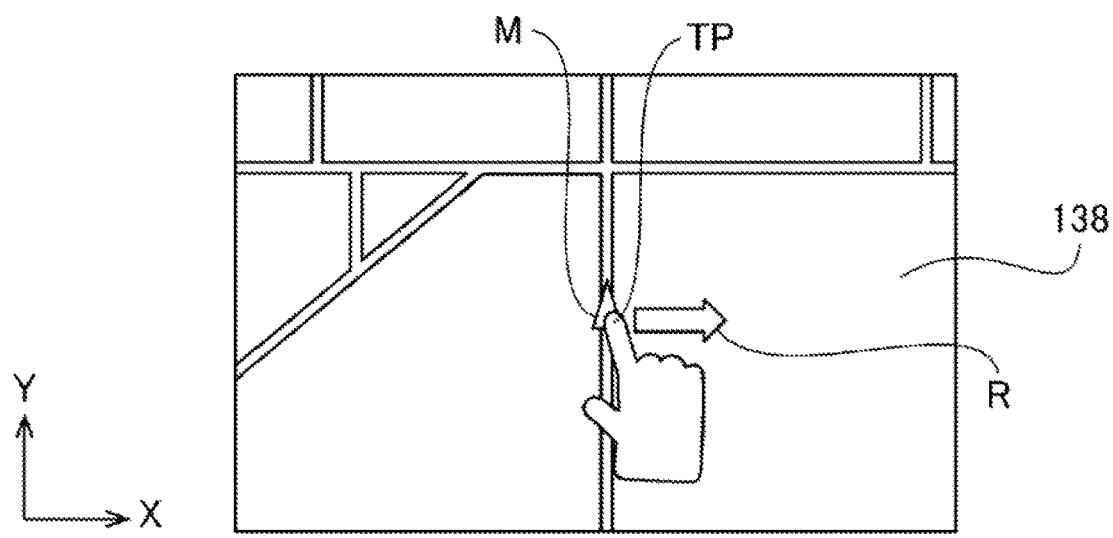
FIG. 2A is a diagram showing an example of an image displayed on a screen of an information processing device when a navigation application is executed in an embodiment of the present invention.

As shown in FIG. 2A, when running the navigation application, a map image is displayed on the screen 138, and a mark M indicating the current position of the vehicle is displayed in the center of the screen 138. Although detailed description is omitted, the navigation application displays the mark M on the map image based on position information acquired by a Global Positioning System (GPS) receiver mounted on the vehicle or by an autonomous navigation system.

When the user slides a finger while touching the screen 138, a touch position TP moves. The CPU 100A can detect the slide operation by the user on the screen 138 by monitoring the moving touch position TP.

Figure 2B:
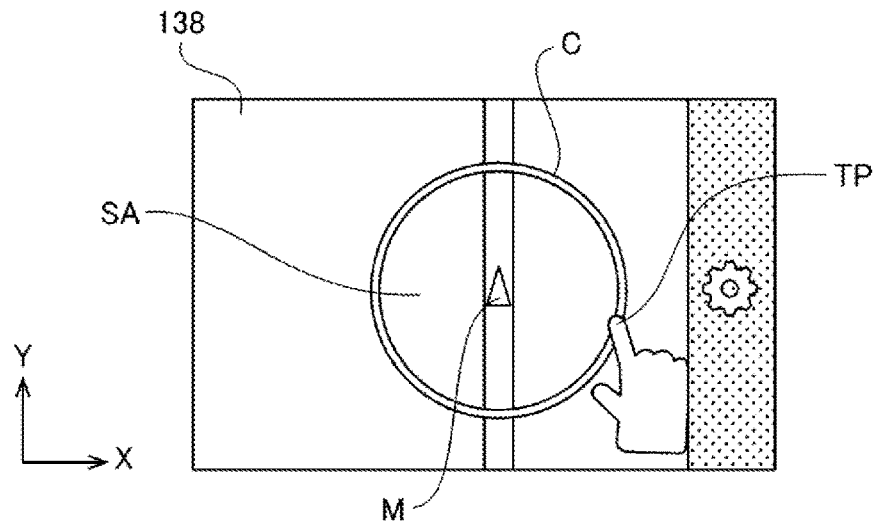
FIG. 2B is a diagram showing an example of an image displayed on a screen of an information processing device when a navigation application is executed in an embodiment of the present invention.

For example, when the user's touch position TP is slid in the direction of arrow R (see FIG. 2A), the navigation application displays a circle C on the map image with a radius of the length of from the base point of the touch position TP (here, the display position of the mark M) to the current touch position TP, as indicated in FIG. 2B. The circle C indicates a destination search range centered on the display position of the mark M (in other words, the current position of the vehicle). The search range surrounded by the circle C has the code SA attached.

The size of circle C is set when the finger of the user is removed from screen 138. In other words, the navigation application sets the circle C as a circle having a radius that is the length from the base point of the touch position TP to the touch release position (in other words, the position on the screen 138 immediately before the finger of the user is released from the screen 138).

Figure 2C:
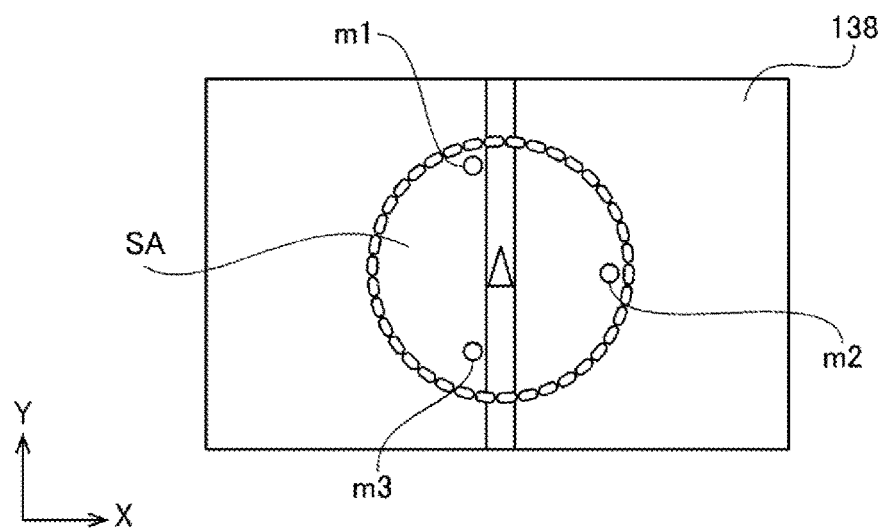
FIG. 2C is a diagram showing an example of an image displayed on a screen of an information processing device when a navigation application is executed in an embodiment of the present invention.
Figure 2D:
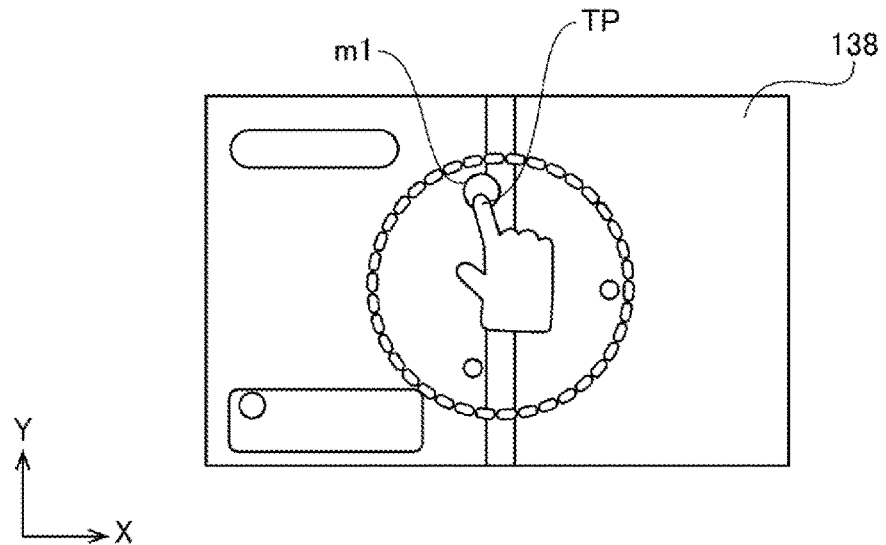
FIG. 2D is a diagram showing an example of an image displayed on a screen of an information processing device when a navigation application is executed in an embodiment of the present invention.

The navigation application searches preset search targets (restaurants, convenience stores, and the like) within the search range SA indicated by the circle C as set, and displays the search targets that are found on the map image. In the example of FIG. 2C, three search targets are found within the search range SA, and marks m1 to m3 indicating these three search targets are displayed on the map image.

When the user touches any one of the marks m1 to m3 (in the example of FIG. 2D, the mark m1 is touched), the navigation application sets the search target indicated by the touched mark as the destination and searches for a route. Guidance is provided along the searched route.

Thus, according to the present embodiment, the user can set the destination with a simple operation. Since detailed operations are not required to set the destination, even if the user performs touch operations without paying attention to the screen 138, erroneous operations do not readily occur.

Note that a sound or vibration may be generated to assist the search operation as described above. For example, when the mark M is touched, the CPU 100A can control the vibrating unit 150 to vibrate the screen 138 in a predetermined vibration pattern, or audio such as "slide your finger to set the search range," or "release finger to confirm the search range" can be output from the speaker 142.

Various patterns are conceivable for the method of setting the search range SA. Two methods of setting the search range SA will be described with reference to FIG. 3A and FIG. 3B.

Figure 3A:
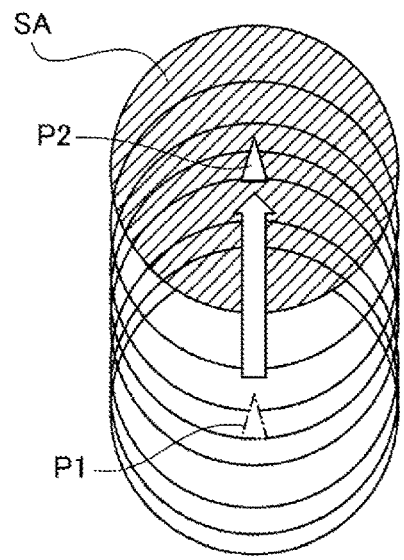
FIG. 3A is a diagram showing a search range set through user touch operation on the screen of the information processing device of an embodiment of the present invention.
Figure 3B:
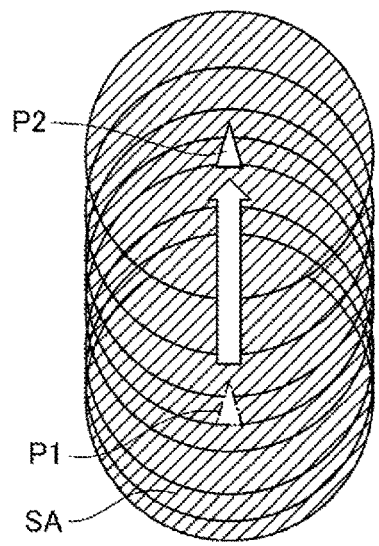
FIG. 3B is a diagram showing a search range set through user touch operation on the screen of the information processing device of an embodiment of the present invention.

FIG. 3A and FIG. 3B are diagrams showing the search range SA set by touch operation of the user on the screen 138. FIG. 3A shows the search range SA of Example 1. FIG. 3B shows the search range SA of Example 2. In the examples of FIG. 3A and FIG. 3B, the user continues to touch the screen 138 until the vehicle moves from position P1 to position P2.

The search range SA of Example 1 is set using a method described with reference to FIG. 2A to FIG. 2D. In other words, in Example 1, as indicated by the hatched area in FIG. 3A, the area inside the circle around the current position of the mark M on the map image is set as the search range SA. In Example 1, the circular search range SA moves as the vehicle moves.

In Example 2, as indicated by the hatched area in FIG. 3B, the entire area inside the circle centered on the position of the mark M on the map image for each point as the finger is slid from touching on the mark M until the finger is released from the screen 138 is the search range SA. In Example 2, the search range SA expands as the vehicle moves.

In Example 1, the user tends to limit the search range SA to the nearest range from the current position. On the other hand, in Example 2, the user can readily visually understand the point in time for which the user desires to perform a destination search, and the search range SA is set to a range along the travel route starting at the present up to this point in time.

In response to touch operation of the user on the screen 138, the CPU 100A can execute various functions of the navigation application in addition to setting the search range SA shown in FIG. 2A to FIG. 2D.

FIG. 4A to FIG. 4D are diagrams showing GUIs for executing functions in response to touch operation of the user on the screen 138.

Figure 4A:
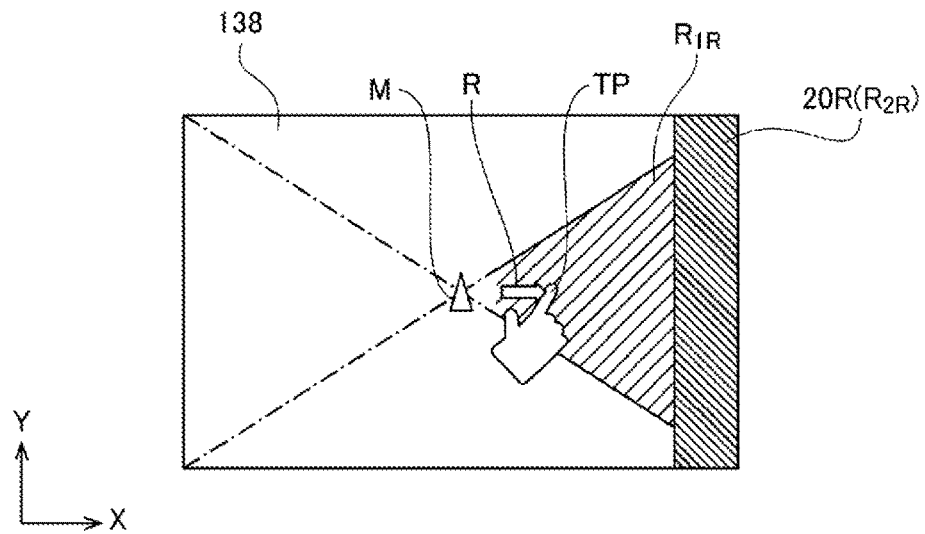
FIG. 4A is a diagram showing a GUI (Graphical User Interface) for executing a function according to user touch operation on the screen of the information processing device in an embodiment of the present invention.
Figure 4B:
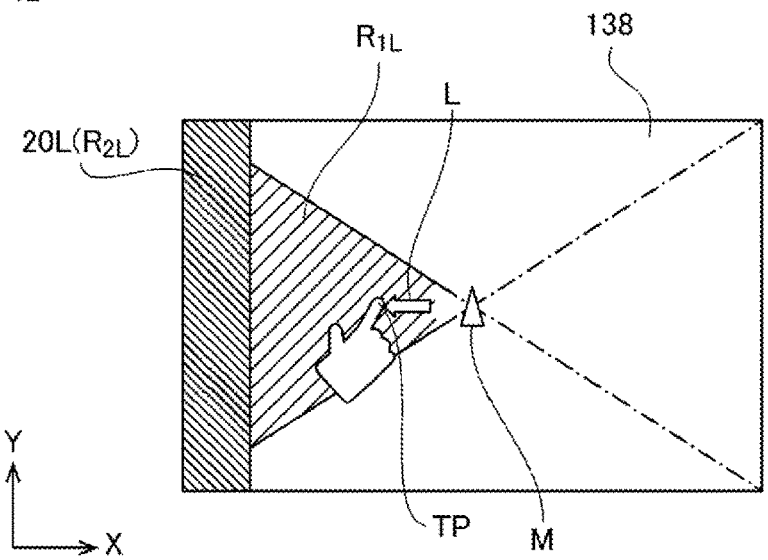
FIG. 4B is a diagram showing a GUI for executing a function according to user touch operation on the screen of the information processing device in an embodiment of the present invention.
Figure 4C:
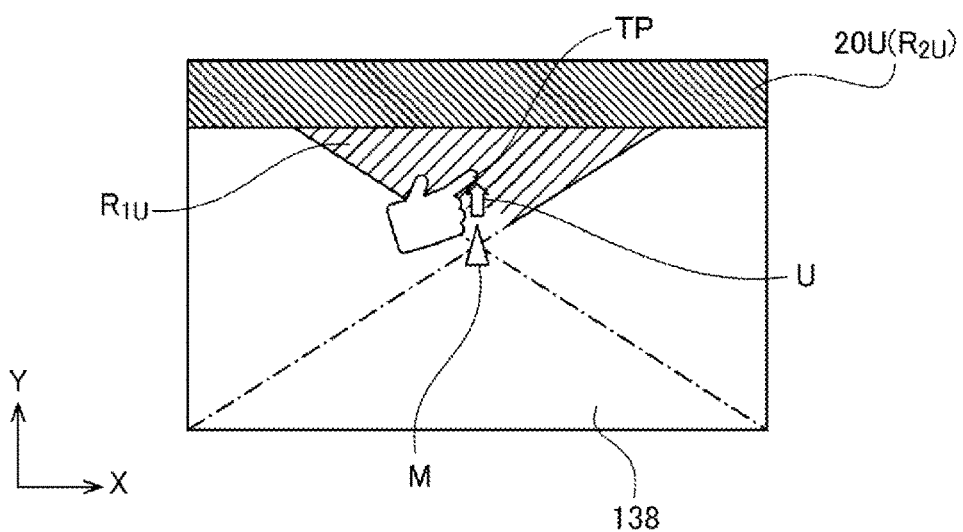
FIG. 4C is a diagram showing a GUI for executing a function according to user touch operation on the screen of the information processing device in an embodiment of the present invention.
Figure 4D:
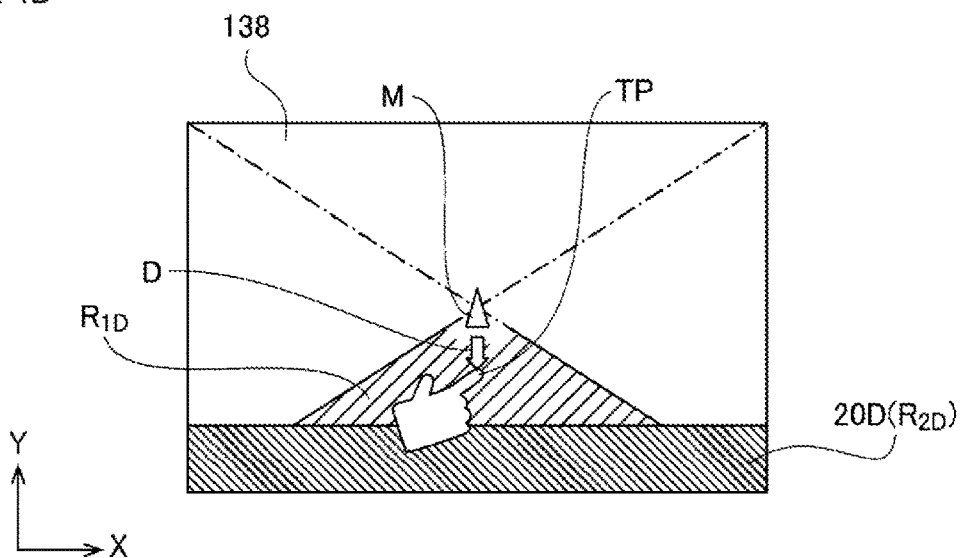
FIG. 4D is a diagram showing a GUI for executing a function according to user touch operation on the screen of the information processing device in an embodiment of the present invention.

As shown in FIG. 4A, a triangular area positioned to the right of the center of screen 138 is labeled $R_{1R}$. In addition, a peripheral area along the right side of the screen 138 within the screen 138 is labeled $R_{2R}$. As shown in FIG. 4B, a triangular area positioned to the left of the center of screen 138 is labeled $R_{1L}$. In addition, a peripheral area along the left side of the screen 138 within the screen 138 is labeled $R_{2L}$. As shown in FIG. 4C, a triangular area positioned to the top of the center of screen 138 is labeled $R_{1U}$. In addition, a peripheral area along the upper side of the screen 138 within the screen 138 is labeled $R_{2U}$. As shown in FIG. 4D, a triangular area positioned on the bottom side of the center of screen 138 is labeled $R_{1D}$. In addition, a peripheral area along the bottom side of the screen 138 within the screen 138 is labeled $R_{2D}$ Any one of the peripheral areas $R_{2R}$, $R_{2L}$, $R_{2U}$, and $R_{2D}$ is an example of the first peripheral area, and any one peripheral area other than the first peripheral area is an example of the second peripheral area.

As shown in FIG. 4A, when the touch position TP of the user is slid from the center of the screen 138 in the direction of the arrow R and enters the area $R_{1R}$, an operator 20R is placed in the peripheral area $R_{2R}$ along the right side of the screen 138.

As shown in FIG. 4B, when the touch position TP of the user is slid from the center of the screen 138 in the direction of the arrow L and enters the area $R_{1L}$, an operator 20L is placed in the peripheral area $R_{2L}$ along the left side of the screen 138.

As shown in FIG. 4C, when the touch position TP of the user is slid from the center of the screen 138 in the direction of the arrow U and enters the area $R_{1U}$, an operator 20U is placed in the peripheral area $R_{2U}$ along the upper side of the screen 138.

As shown in FIG. 4D, when the touch position TP of the user is slid from the center of the screen 138 in the direction of the arrow D and enters the area $R_{1D}$, an operator 20D is placed in the peripheral area $R_{2D}$ along the bottom side of the screen 138.

The CPU 100A executes a function according to the touch operation of the user on the operator displayed in the peripheral area of screen 138.

Note that when the touch position TP of the user is slid to any peripheral area of the screen 138, a sound alerting this may be output from the speaker 142, or vibration of the screen 138 in a vibration pattern may provide this alert.

Figure 5A:
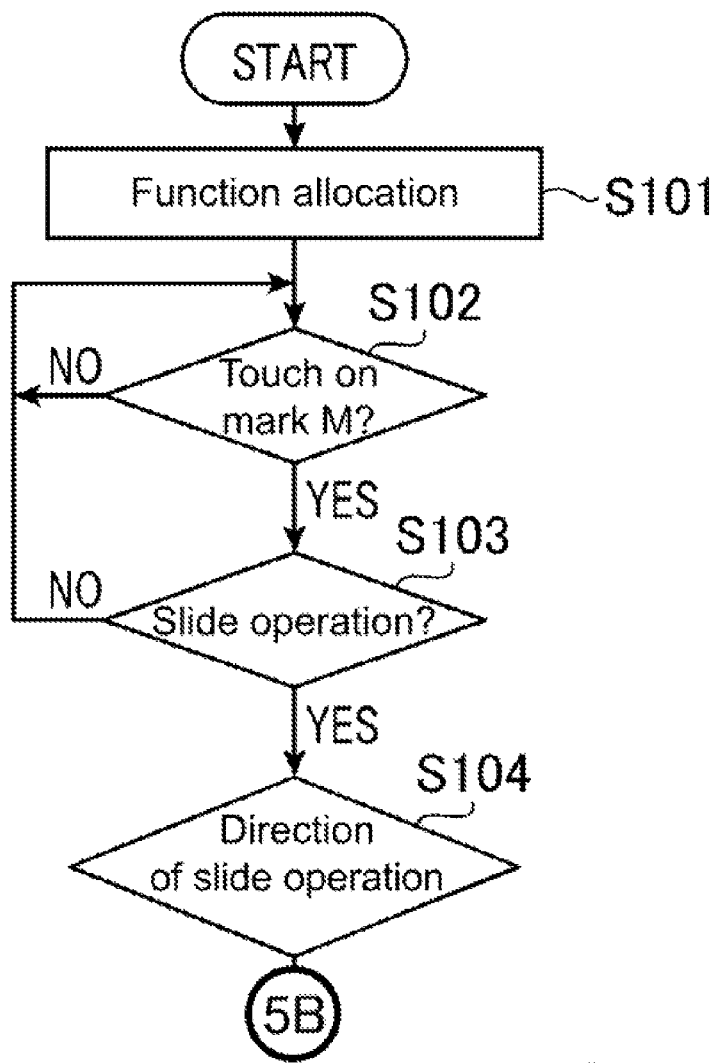
FIG. 5A and FIG. 5B together comprise FIG. 5 which is a flowchart showing processing of a program for executing by means of a Central Processing Unit (CPU) of the information processing device of an embodiment of the present invention.
Figure 5B:
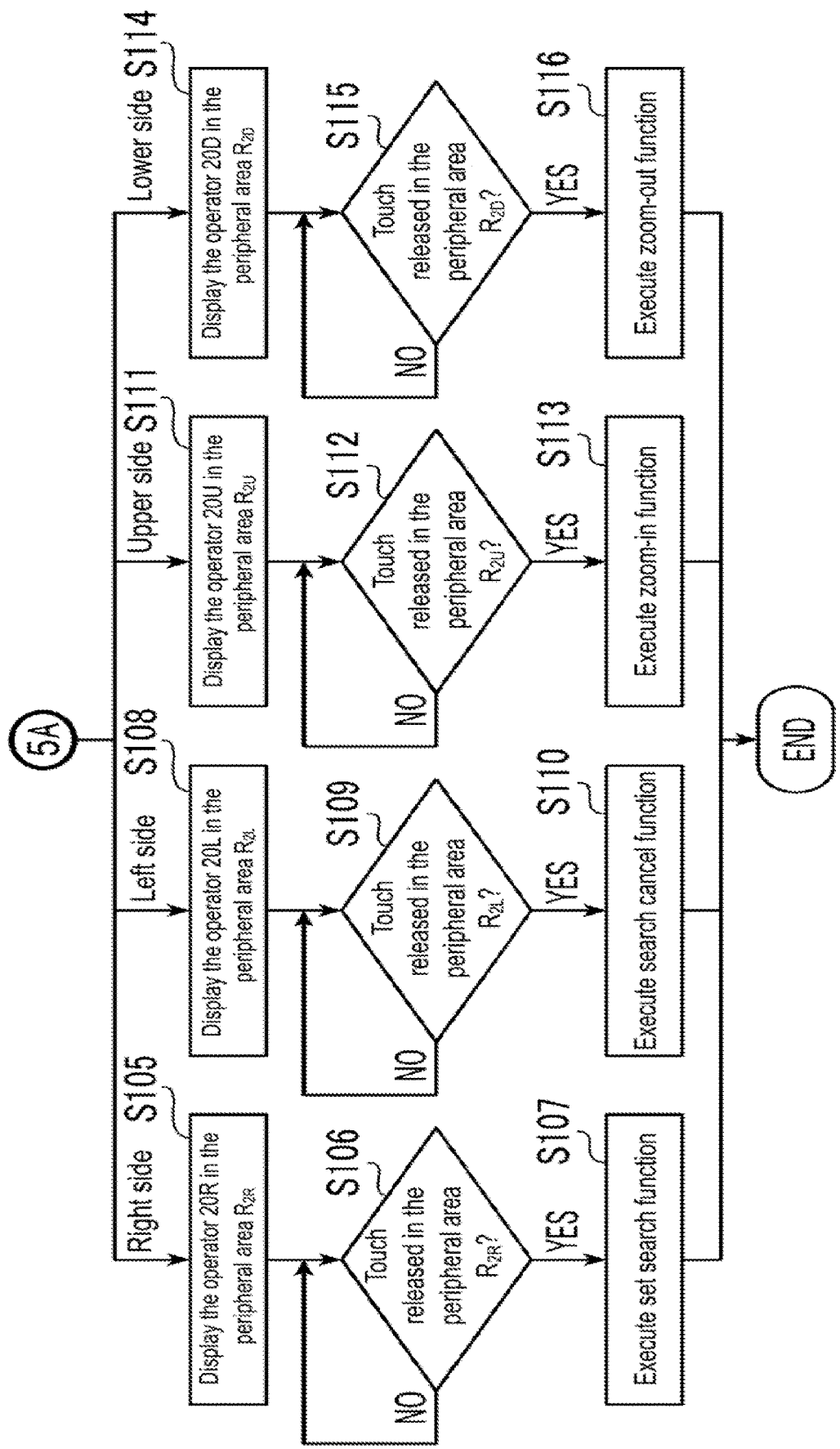

FIG. 5 is a flowchart showing processing of program 102 executed by CPU 100A in one embodiment of the present invention. In the process shown in FIG. 5, operators are displayed in the peripheral area of the screen 138 according to touch operation by the user, and functions are executed according to touch operation of the user on the operators thus displayed.

FIG. 5 describes an example of processing when the navigation application is executed. An example of this processing will be described with reference to image display examples of FIG. 6A to FIG. 6C, FIG. 7A to FIG. 7C, FIG. 8A to FIG. 8C, and FIG. 9A to FIG. 9C.

When, for example, execution of the application 106 starts (excluding an application 106 in the background not shown on the screen 138), the CPU 100A starts execution of the flowchart process shown in FIG. 5.

Here, the ROM 100C holds association information that associates different functions for each application 106 with each of the peripheral areas $R_{2R}$, $R_{2L}$, $R_{2U}$, and $R_{2D}$.

For example, for the navigation application, in the association information, the peripheral area $R_{2R}$ and the search settings function are associated, the peripheral area $R_{2L}$ and the search cancel function are associated, the peripheral area $R_{2U}$ and the zoom-in function are associated, and the peripheral area $R_{2D}$ and the zoom-out function are associated with each other.

For example, for an air conditioner control application, in the association information, the peripheral area $R_{2R}$ and the raise set temperature function are associated, the peripheral area $R_{2L}$ and the lower set temperature function are associated, the peripheral area $R_{2U}$ is associated with the raise air flow function, and peripheral area $R_{2D}$ is associated with the lower air flow function.

The CPU 100A acquires from the ROM 100C the association information of the application 106 (in this case, the navigation application) for which execution has started, and according to the acquired association information, allocates functions to each of the peripheral areas $R_{2R}$, $R_{2L}$, $R_{2U}$, and $R_{2D}$ (here, respectively search settings function, search cancel function, zoom-in function, and zoom-out function) (step S101).

The function allocated to the first peripheral area (one of the peripheral areas $R_{2R}$, $R_{2L}$, $R_{2U}$, and $R_{2D}$) is an example of the first function. A function allocated to the second peripheral area (any one of the peripheral areas other than the first peripheral area) is an example of the second function. In other words, the CPU 100A executing the program 102 operates as the function allocating unit 100b: allocating the first function to the first peripheral area within the screen 138 along a first side of the screen 138; and allocating the second function to the second peripheral area in the screen 138 along a second side of the screen 138.

When the CPU 100A detects a touch operation by the user on the mark M (step S102: YES), the CPU 100A determines whether or not a slide operation with mark M as a base point has been performed (step S103).

In addition, when the CPU 100A detects touch operation of the user on the mark M, the CPU 100A performs draw processing of a circle C centered on the mark M in parallel with the processing shown in FIG. 5.

Figure 6A:
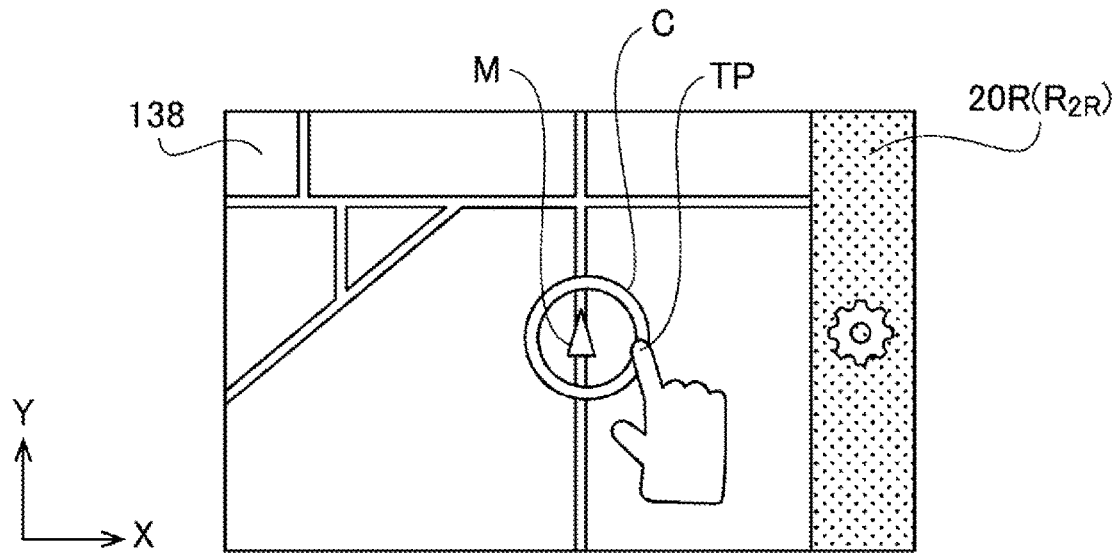
FIG. 6A is a diagram showing an example of an image displayed on the screen of an information processing device when the navigation application is executed in an embodiment of the present invention.
Figure 6B:
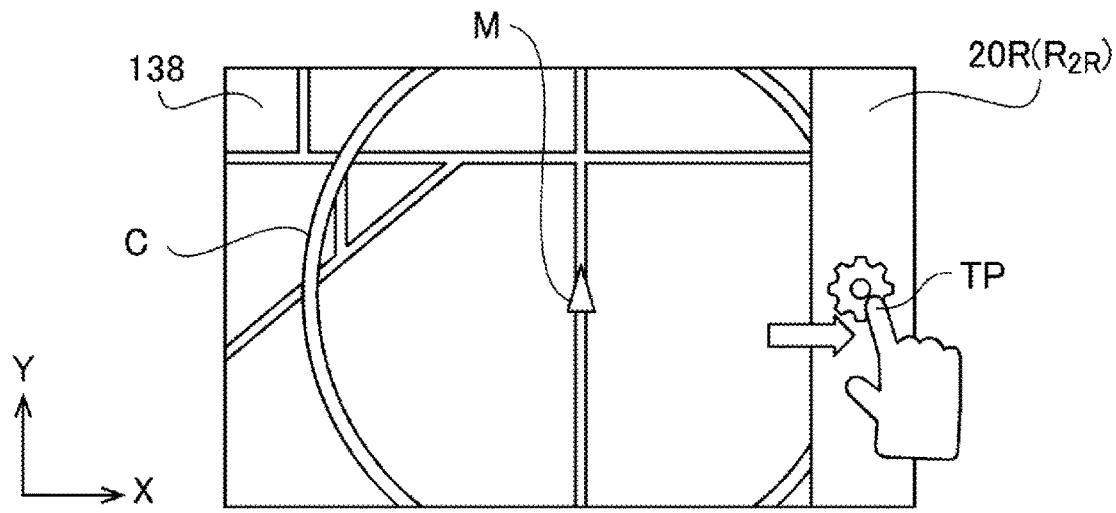
FIG. 6B is a diagram showing an example of an image displayed on a screen of an information processing device when a navigation application is executed in an embodiment of the present invention.

When the CPU 100A detects a slide operation from the mark M to the area $R_{1R}$ (step S103: YES and step S104: right side), the CPU 100A displays the operator 20R in the peripheral area $R_{2R}$ (step S105), as shown in FIG. 6A. The operator 20R is an operator for executing a function (here, search settings function) allocated to the peripheral area $R_{2R}$.

In this manner, when the touch detection unit 100a detects a slide operation in the direction in which the peripheral area is located (in the above example, the right direction in which the peripheral area $R_{2R}$ is located), the CPU 100A operates as the operator display unit 100c that displays operators (operator 20R in the above example) for executing functions allocated to the peripheral area in the peripheral area located in the direction of the detected slide operation.

The CPU 100A determines whether or not the touch position TP of the user has slid beyond the area $R_{1R}$ to the peripheral area $R_{2R}$ (see FIG. 6B) and whether or not touch has been released at the peripheral area $R_{2R}$ (step S106). When touch is released at the peripheral area $R_{2R}$ (step S106: YES), the CPU 100A executes the search settings function (step S107).

Figure 6C:
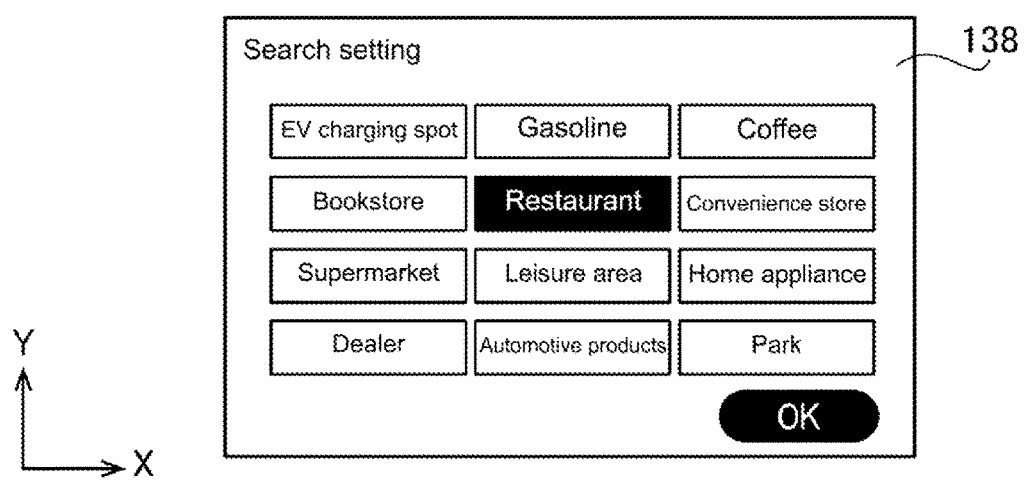
FIG. 6C is a diagram showing an example of an image displayed on a screen of an information processing device when a navigation application is executed in an embodiment of the present invention.

When execution of the search settings function is started, a search target settings screen is displayed on the screen 138 as shown in FIG. 6C. The user can set the search target by touching the search target listed on the settings screen.

In this manner, when the touch detection unit 100a detects a slide operation from outside the peripheral area to inside the peripheral area (in the above example, a slide operation into the peripheral area $R_{2R}$), the CPU 100A detects the detected slide operation destination, the CPU 100a operates as the function executing unit 100d and executes the function (in the above example, the search settings function) allocated to the peripheral area that is the destination of the slide operation (or, more precisely, according to the touch operation of operator indicated on the peripheral area in question) based on the touch operation in the peripheral area into which the slide operation is performed.

Figure 7A:
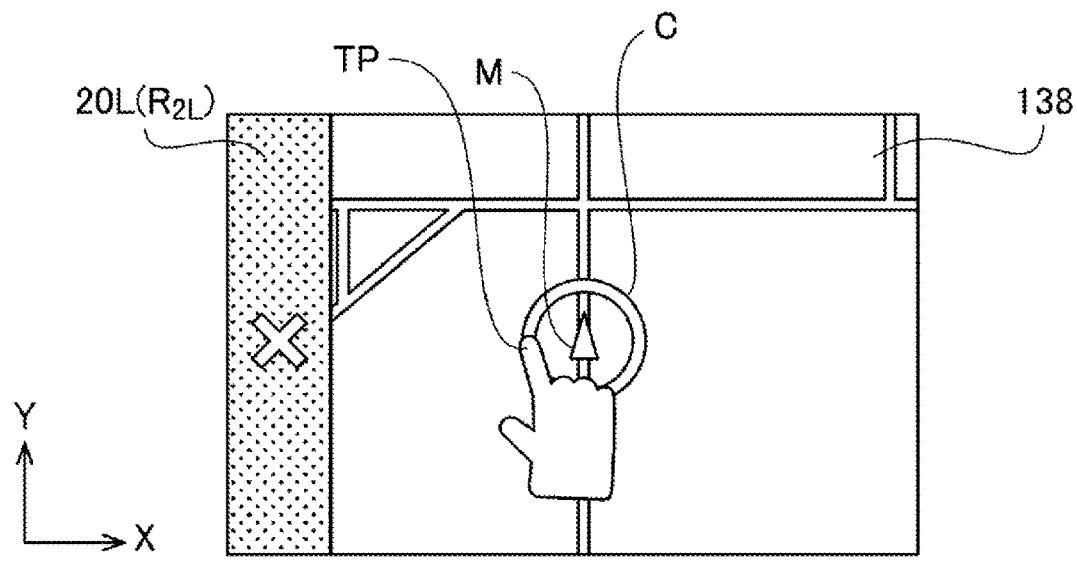
FIG. 7A is a diagram showing an example of an image displayed on the screen of an information processing device when the navigation application is executed in an embodiment of the present invention.
Figure 7B:
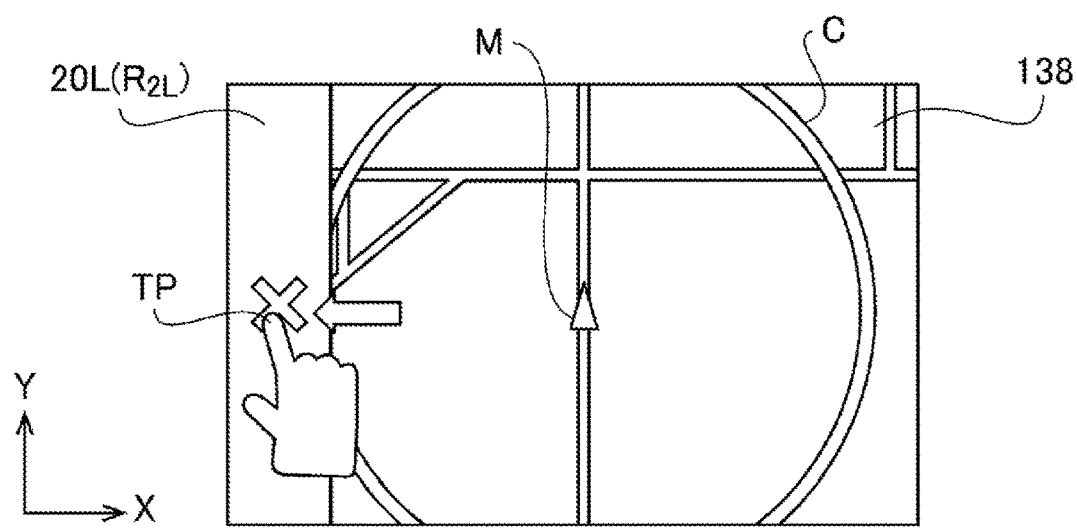
FIG. 7B is a diagram showing an example of an image displayed on a screen of an information processing device when a navigation application is executed in an embodiment of the present invention.

When the CPU 100A detects a slide operation from the mark M to the area $R_{1L}$ (step S103: YES and step S104: left side), the CPU 100A displays the operator 20L in the peripheral area $R_{2L}$ (step S108), as shown in FIG. 7A. The operator 20L is an operator for executing a function (here, search cancel function) allocated to the peripheral area $R_{2L}$.

Also in step S108, the CPU 100A operates as the operator display unit 100c, similar to step S105.

The CPU 100A determines whether or not the touch position TP of the user has slid beyond the area $R_{1L}$ to the peripheral area $R_{2L}$ (see FIG. 7B) and whether or not touch has been released at the peripheral area $R_{2L}$ (step S109). When touch is released at the peripheral area $R_{2L}$ (step S109: YES), the CPU 100A executes the search cancel function (step S110).

Figure 7C:
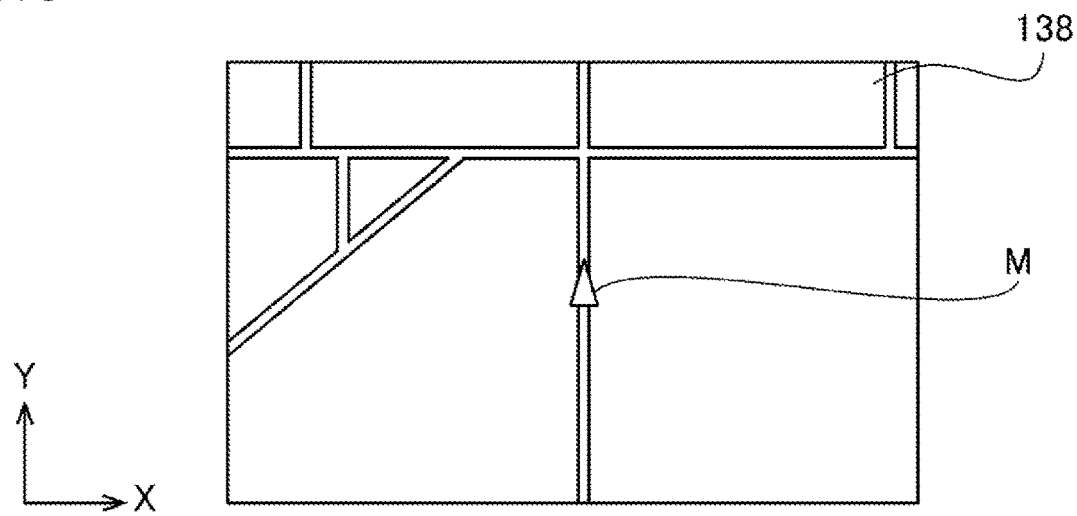
FIG. 7C is a diagram showing an example of an image displayed on a screen of an information processing device when a navigation application is executed in an embodiment of the present invention.

When the search cancel function is executed, the display of the screen 138 returns to the display before the touch operation, as shown in FIG. 7C.

Also in step S110, the CPU 100A operates as the function executing unit 100d, similar to step S107.

Figure 8A:
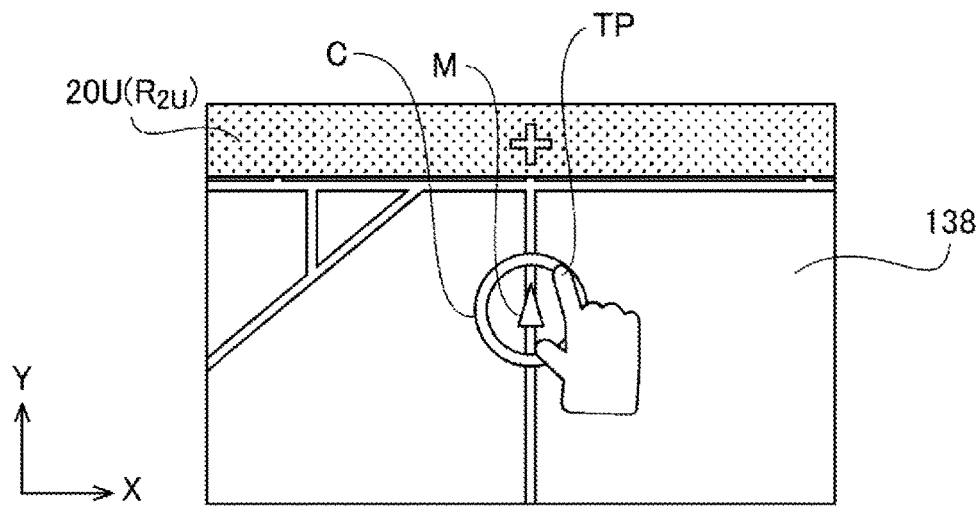
FIG. 8A is a diagram showing an example of an image displayed on the screen of an information processing device when the navigation application is executed in an embodiment of the present invention.
Figure 8B:
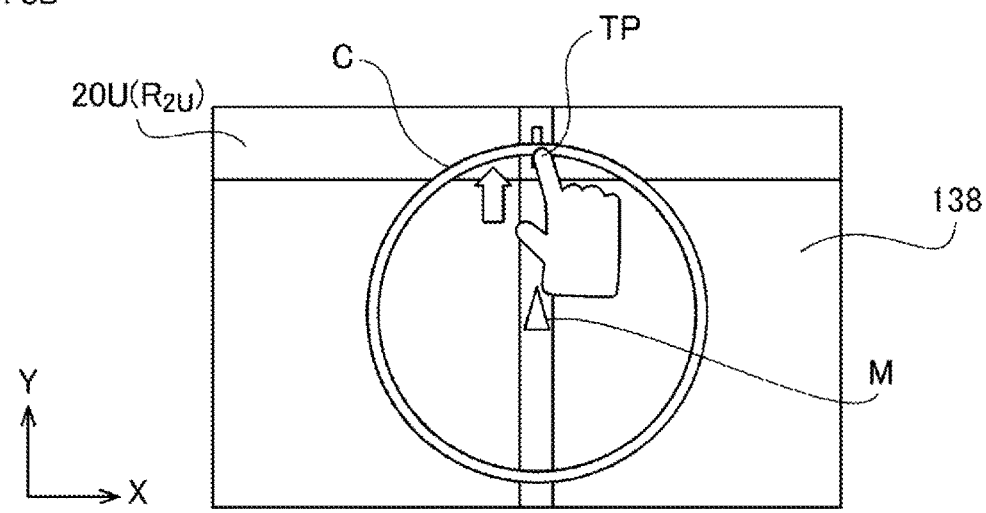
FIG. 8B is a diagram showing an example of an image displayed on a screen of an information processing device when a navigation application is executed in an embodiment of the present invention.

When the CPU 100A detects a slide operation from the mark M to the area $R_{1U}$ (step S103: YES and step S104: upper side), the CPU 100A displays the operator 20U in the peripheral area $R_{2U}$ (step S111), as shown in FIG. 8A. The operator 20U is an operator for executing a function (here, zoom-in function) allocated to the peripheral area $R_{2U}$.

Also in step S111, the CPU 100A operates as the operator display unit 100c, similar to step S105.

The CPU 100A determines whether or not the touch position TP of the user has slid beyond the area $R_{1U}$ to the peripheral area $R_{2U}$ (see FIG. 8B) (step S112). If the touch position slides into the peripheral area $R_{2U}$ (step S112: YES), the CPU 100A executes the zoom-in function (step S113).

Figure 8C:
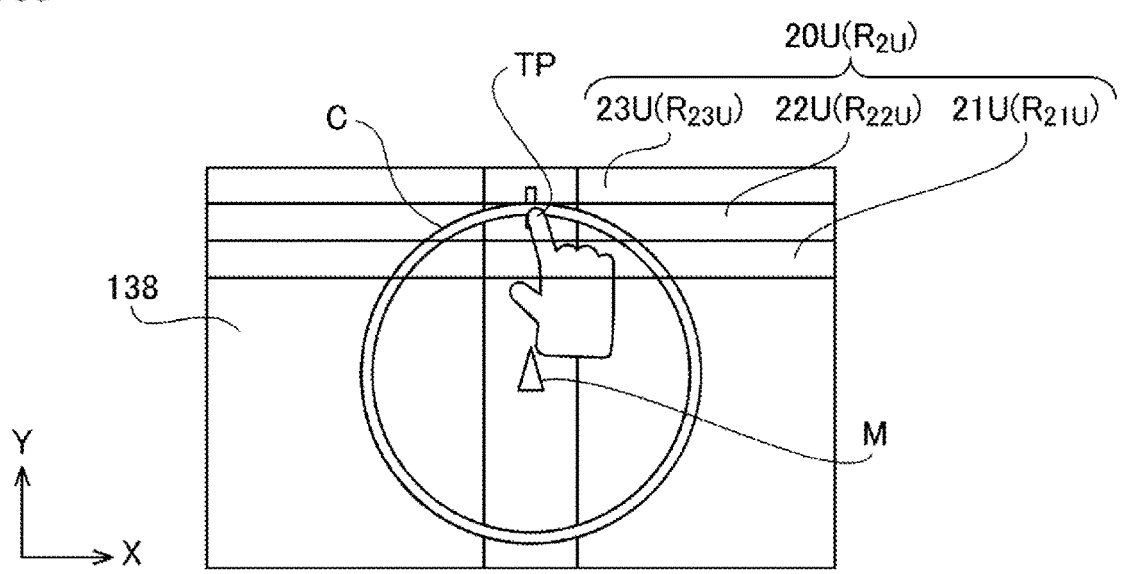
FIG. 8C is a diagram showing an example of an image displayed on a screen of an information processing device when a navigation application is executed in an embodiment of the present invention.

When executing the zoom-in function, the CPU 100A divides the peripheral area $R_{2U}$ into a plurality of divided areas. In the example of FIG. 8C, the peripheral area $R_{2U}$ is divided into three in the Y direction. These divided areas are referred to as $R_{21U}$, $R_{22U}$, and $R_{23U}$ in order from the center of the screen 138. The operator in the divided area $R_{21U}$ is referred to as operator 21U, the operator in the divided area $R_{22U}$ is referred to as operator 22U, and the operator in the divided area $R_{23U}$ is referred to as operator 23U.

The CPU 100A enlarges (zooms in) the scale of the map image according to the duration of the touch on the operators 21U to 23U. Specifically, the CPU 100A enlarges the scale of the map image as the duration of the touch becomes longer.

Also, a different magnification rate (rate of enlarging of map image per unit time while the touch is continued; magnification rate is greater than 1) is set for each operator. Of the operators 21U to 23U, the magnification rate for the operator 21U is set the smallest, the operator 22U is set to the next smallest magnification rate, and the operator 23U is set to the largest magnification rate.

For example, if the user keeps touching the operator 23U for n seconds, the scale of the map image is enlarged by $n_1$ times. On the other hand, when the user continues to touch the operator 21U for n seconds, the scale of the map image is enlarged by $n_2$ times ($n_2 < n_1$).

In this manner, the CPU 100A operating as the function executing unit 100d controls the set value of the function (in the above example, the enlargement ratio of the map image) according to the duration of the touch operation on the operator. In addition, the peripheral areas are divided into a plurality of areas including a first divided area (for example, operator 21U) and a second divided area (for example, operator 23U) farther from the center of screen 138 than the first divided area. When the CPU 100A operating as the function executing unit 100d detects touch operation for the first duration on the second divided area, changes to function settings are more significant than for the case of detecting touch operation for the first duration on the first divided area.

Figure 9A:
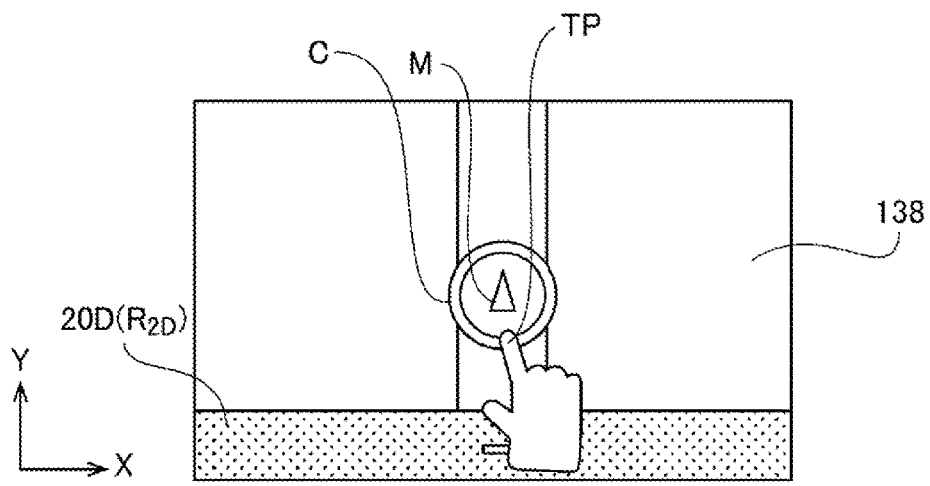
FIG. 9A is a diagram showing an example of an image displayed on the screen of an information processing device when the navigation application is executed in an embodiment of the present invention.
Figure 9B:
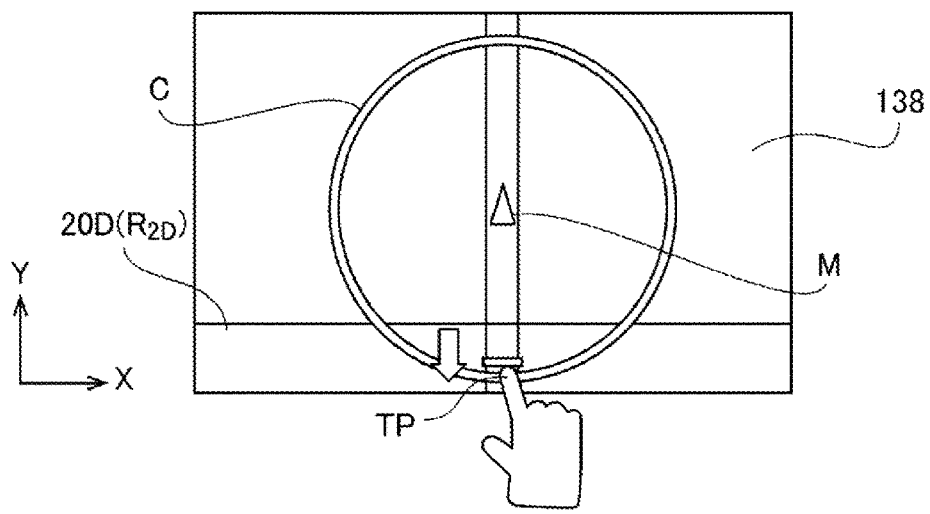
FIG. 9B is a diagram showing an example of an image displayed on a screen of an information processing device when a navigation application is executed in an embodiment of the present invention.

When the CPU 100A detects a slide operation from the mark M to the area $R_{1D}$ (step S103: YES and step S104: bottom side), the CPU 100A displays the operator 20D in the peripheral area $R_{2D}$ (step S114), as shown in FIG. 9A. The operator 20D is an operator for executing a function (here, zoom-out function) allocated to the peripheral area $R_{2D}$.

Also in step S114, the CPU 100A operates as the operator display unit 100c, similar to step S105.

The CPU 100A determines whether or not the touch position TP of the user has slid beyond the area Rio to the peripheral area $R_{2D}$ (see FIG. 9B) (step S115). If the touch position slides into the peripheral area $R_{2D}$ (step S115: YES), the CPU 100A executes the zoom-out function (step S116).

Also when executing the zoom-out function, the CPU 100A divides the peripheral area $R_{2D}$ into a plurality of divided areas (divided areas $R_{21D}$, $R_{22D}$, and $R_{23D}$ in order of proximity to the center of the screen 138). The operator in the divided area $R_{21D}$ is referred to as operator 21D, the operator in the divided area $R_{22D}$ is referred to as operator 22D, and the operator in the divided area $R_{23D}$ is referred to as operator 23D.

The CPU 100A reduces the scale of the map image (zooms out) according to the duration of the touch on the operators 21D to 23D. Specifically, the CPU 100A reduces the scale of the map image as the duration of the touch becomes longer.

Also, a different magnification rate (rate of reducing map image per unit time while the touch is continued; magnification rate is less than 1) is set for each operator. Of the operators 21D to 23D, the magnification rate for the operator 21D is set the largest, the operator 22D is set to the next largest magnification rate, and the operator 23D is set to the smallest magnification rate. Of the operators 21D to 23D, the magnification rate set for the operator 21D is the value closest to 1 (for example, 0.8), and the magnification rate set for the operator 23D is closest to 0 (for example, 0.5 times).

For example, if the user continues to touch the operator 23D for n seconds, the scale of the map image is enlarged by $n_3$ times. On the other hand, when the user continues to touch the operator 21D for n seconds, the scale of the map image is enlarged by $n_4$ times ($n_3 < n_4$)

Also, in step S116, the CPU 100A operates as the function executing unit 100d, similar to step S113

In addition, the upper side (example of the first side) of the screen 138 along which the peripheral area $R_{2U}$ runs is the opposite side to the lower side (an example of the second side) of the screen 138 along which the peripheral area $R_{2D}$ runs. The zoom-in function (example of the first function) allocated to the peripheral area $R_{2U}$, and the zoom-out function (example of the second function) allocated to the peripheral area $R_{2D}$ are paired functions with common setting values for changing in the plus direction and changing in the minus direction.

Allocating the paired functions to the peripheral areas along opposite sides of the screen 138 enables the user to more intuitively change the set values of the function.

According to the present embodiment, the user can have the information processing device 1 execute the application 106 function through simple operation of sliding a finger from the center of the screen 138 to close to a side thereof and lifting the finger. Therefore, even if the user performs a touch operation without focusing on the screen 138, an erroneous operation does not readily occur.

Also, the peripheral area, which is the slide operation destination, is located near the physical structure of the side of the screen 138. Therefore, the user can easily understand the position of the peripheral area without focusing on the screen 138. For this point as well, even if the user performs a touch operation without focusing on the screen 138, an erroneous operation does not readily occur.

In addition, operators are not displayed on the screen 138 unless a slide operation is performed with the display position of the mark M as a base point. Therefore, more display objects such as map images can be displayed on the screen 138.

Note that when touching is terminated at a position that is not included in any of the peripheral areas $R_{2R}$, $R_{2L}$, $R_{2U}$, and $R_{2D}$, the CPU 100A terminates the processing of the flowchart of FIG. 5 and as shown in FIG. 2C, the circle C is fixed at that time, and the search target is searched from within the search range SA, and the search target that is found is displayed on the map image. The CPU 100A sets a destination according to a touch operation on a mark indicating a search target, searches for a route, and provides guidance.

An example of processing when an application other than the navigation application is executed will be described. An example of processing when the camera application is executed will be described with reference to FIG. 10A to FIG. 10D.

Figure 10A:
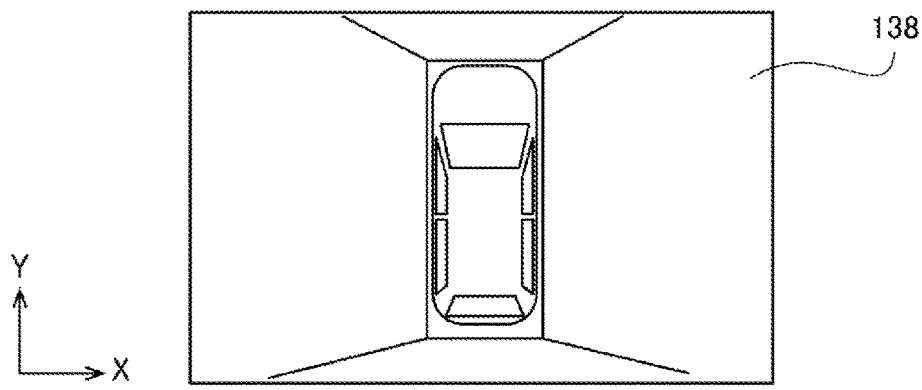
FIG. 10A is an explanatory diagram of a camera application example executed by an embodiment of the present invention.
Figure 10B:
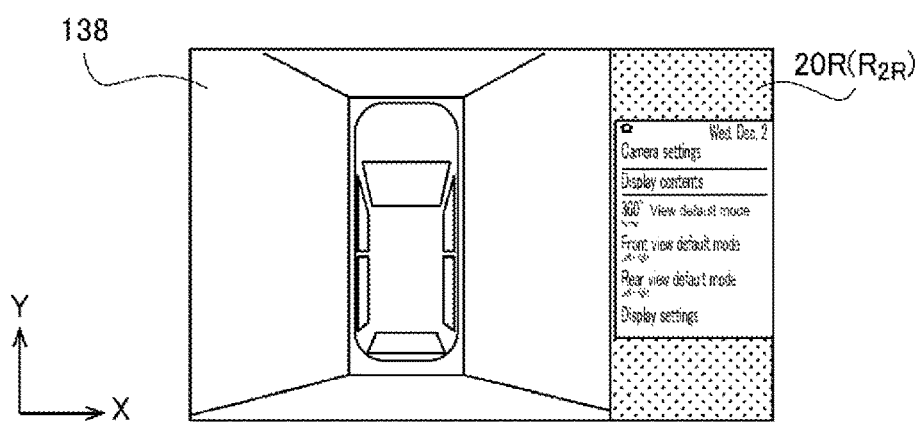
FIG. 10B is an explanatory diagram of a camera application example executed by an embodiment of the present invention.
Figure 10C:
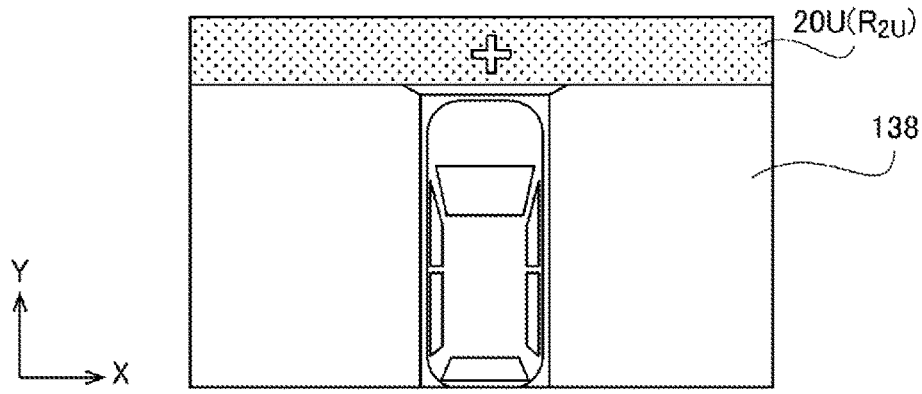
FIG. 10C is an explanatory diagram of a camera application example executed by an embodiment of the present invention.
Figure 10D:
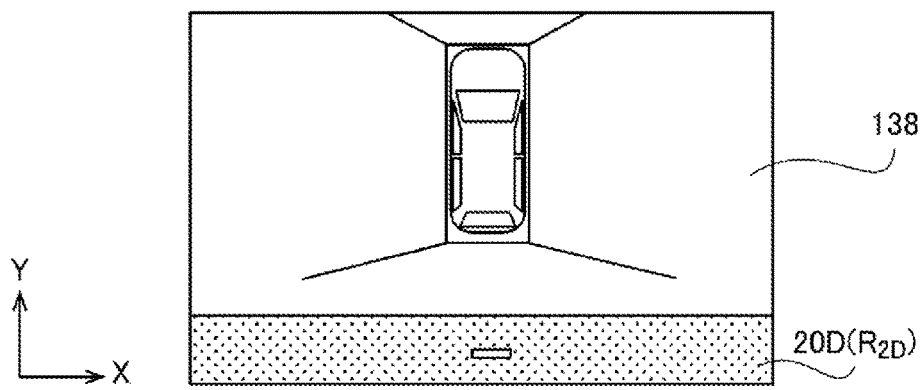
FIG. 10D is an explanatory diagram of a camera application example executed by an embodiment of the present invention.

For example, the camera application is executed when the gear shift is switched into reverse. FIG. 10A is an example of a bird's-eye view image of a vehicle displayed on the screen 138 when the camera application is executed.

Similar to step S101 in FIG. 5, the CPU 100A acquires camera application association information from the ROM 100C, and allocates functions to the peripheral areas $R_{2R}$, $R_{2L}$, $R_{2U}$, and $R_{2D}$ according to the acquired association information.

For example, when a slide operation to the area $R_{1R}$ is detected, the CPU 100A displays the operator 20R in the peripheral area $R_{2R}$ (see FIG. 10B) as in step S105 of FIG. 5. In this case, the operator 20R is an operator for setting the camera application.

Various setting items are listed for the operator 20R. If the touch is slid to the peripheral area $R_{2R}$ and released at a position on a setting item of the operator 20R, the CPU 100A executes the setting function of the applicable item.

For example, when a slide operation into the area $R_{1U}$ is detected, the CPU 100A displays the operator 20U in the peripheral area $R_{2U}$ (see FIG. 10C), as in step S111 of FIG. 5. In this case, the operator 20U is an operator for executing the zoom-in function of the bird's-eye view image.

When there is a slide operation into the peripheral area $R_{2U}$, the CPU 100A executes the zoom-in function of the bird's-eye view, as in step S113 of FIG. 5

For example, when a slide operation to area Rio is detected, the CPU 100A displays operator 20D in the peripheral area $R_{2D}$ (see FIG. 10D) as in step S114 of FIG. 5. In this case, the operator 20D is an operator for executing the zoom-out function of the bird's-eye view image.

When there is a slide operation into the peripheral area $R_{2D}$, the CPU 100A executes the zoom-out function of the bird's-eye view, as in step S116 of FIG. 5.

Figure 9C:
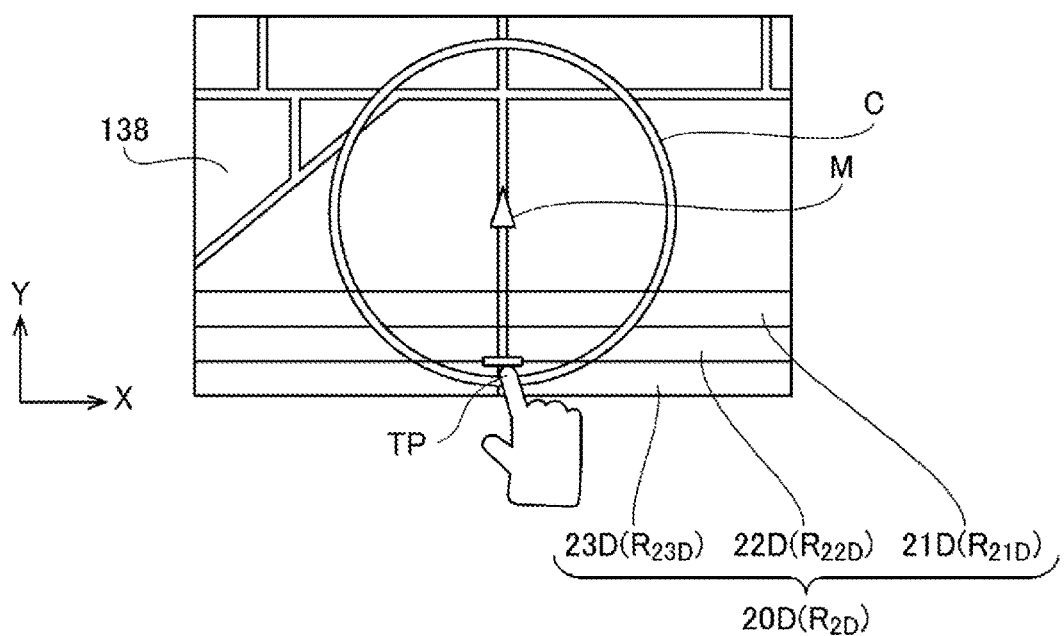
FIG. 9C is a diagram showing an example of an image displayed on a screen of an information processing device when a navigation application is executed in an embodiment of the present invention.

Note that the peripheral areas $R_{2U}$ and $R_{2D}$ may be divided into a plurality of areas with different magnification rates, as in the examples of FIG. 8C and FIG. 9C. The user can change the zoom-in and zoom-out speed of the bird's-eye view image according to the divided area touched.

A processing example when the 3D viewer application is executed will be described. Execution of the 3D viewer application is started based on operation of the operation unit 120. When execution of the 3D viewer application is started, a 3D model of the vehicle, for example, is displayed on the screen 138

Similar to step S101 in FIG. 5, the CPU 100A acquires 3D viewer application association information from the ROM 100C, and allocates functions to the peripheral areas $R_{2R}$, $R_{2L}$, $R_{2U}$, and $R_{2D}$ according to the acquired association information. For example, the peripheral areas $R_{2R}$, $R_{2L}$, $R_{2U}$, and $R_{2D}$ are allocated the functions of rotating the 3D model of the vehicle to the right, left, up, and down.

When a slide operation into the various areas $R_{1R}$, $R_{1L}$, $R_{1U}$, and $R_{1D}$ is detected, the CPU 100A displays an operator in the peripheral area located in the direction of the slide operation. When the slide operation extends to the displayed operator, the CPU 100A rotates the 3D model of the vehicle being displayed on the screen 138. As an example, a slide operation that extends to the operator displayed in the peripheral area $R_{2R}$ rotates the 3D model of the vehicle being displayed on the screen 138 to the right.

The function of rotating right is allocated to the peripheral area $R_{2R}$ along the right side of the screen 138. In addition, the function of rotating left is allocated to the peripheral area $R_{2L}$ along the left side of the screen 138. Also, the function of rotating upward is allocated to the peripheral area $R_{2U}$ along the upper part of the screen 138. Lastly, the function of rotating downward is allocated to the peripheral area $R_{R2D}$ along the lower side of the screen 138. Since the direction in which the peripheral area is located on the screen 138 and the corresponding rotation direction match, the user can intuitively perform a rotation operation of the 3D model.

An example of processing when an audio application is executed will be described. Execution of the audio application is started based on operation of the operation unit 120. When execution of the audio application is started, for example, a controller for the audio application is displayed on screen 138.

Similar to step S101 in FIG. 5, the CPU 100A acquires audio application association information from the ROM 100C, and allocates functions to the peripheral areas $R_{2R}$, $R_{2L}$, $R_{2U}$, and $R_{2D}$ according to the acquired association information. For example, a channel selection up function, a channel selection down function, a volume up function, and a volume down function are allocated to each of the peripheral areas $R_{2R}$, $R_{2L}$, $R_{2U}$, and $R_{2D}$.

When a slide operation into the various areas $R_{1R}$, $R_{1L}$, $R_{1U}$, and $R_{1D}$ is detected, the CPU 100A displays an operator in the peripheral area located in the direction of the slide operation. When the slide operation extends to the displayed operator, the CPU 100A executes the corresponding function.

For example, when the slide operation extends to the operator displayed in the peripheral area $R_{2R}$, the volume of the sound output from the speaker 142 is increased. The longer the duration of touch on the operator the more volume is increased. Also, if the slide operation extends to the operator displayed in the peripheral area $R_{2L}$, the volume of the sound output from the speaker 142 is lowered. The longer the duration of touch on the operator the more volume is decreased For example, if the slide operation extends to the operator displayed in the peripheral area $R_{2U}$, channel selection is changed to a channel with a higher frequency. The selected channel is changed to a channel with a higher frequency each time the duration of touching the operator exceeds a certain amount of time. For example, if the slide operation extends to the operator displayed in the peripheral area $R_{2U}$, channel selection is changed to a channel with a lower frequency. The selected channel is changed to a channel with a lower frequency each time the duration of touching the operator exceeds a certain amount of time.

The volume up function allocated to the peripheral area $R_{2R}$ and the volume down function allocated to the peripheral area $R_{2L}$ are paired functions of a function for changing the common set value to the plus side and a function for changing the common set value to the minus side. In addition, the channel selection up function allocated to the peripheral area $R_{2U}$ and the channel selection down function allocated to the peripheral area $R_{2D}$ are paired functions of a function for changing the common set value to the plus side and a function for changing the common set value to the minus side In the audio application as well, the user can more intuitively change the set value of the function by allocating paired functions to a peripheral area along the opposite side of the screen 138.

A processing example when the air conditioner control application is executed will be described. Execution of the air conditioner control application is started based on operating of the operation unit 120. When execution of the air conditioner control application is started, a controller for air conditioning, for example, is displayed on the screen 138.

Similar to step S101 in FIG. 5, the CPU 100A acquires air conditioner control application association information from the ROM 100C, and allocates functions to the peripheral areas $R_{2R}$, $R_{2L}$, $R_{2U}$, and $R_{2D}$ according to the acquired association information. For example, a raise air flow function, a reduce air flow function, a raise set temperature function, and a lower set temperature function are allocated to each of the peripheral areas $R_{2R}$, $R_{2L}$, $R_{2U}$, and $R_{2D}$.

When a slide operation into the various areas $R_{1R}$, $R_{1L}$, $R_{1U}$, and $R_{1D}$ is detected, the CPU 100A displays an operator in the peripheral area located in the direction of the slide operation. When the slide operation extends to the displayed operator, the CPU 100A executes the corresponding function.

For example, when the slide operation extends to the operator displayed in the peripheral area $R_{2R}$, the set temperature of the air conditioner is raised. The longer the duration of touch on the operator the more temperature is raised. In addition, when the slide operation extends to the operator displayed in the peripheral area $R_{2L}$, the set temperature of the air conditioner is lowered. The longer the duration of touch on the operator the more temperature is lowered.

For example, when the slide operation extends to the operator displayed in the peripheral area $R_{2U}$, the air flow of the air conditioner is increased. The longer the duration of touch on the operator the more air flow is increased. In addition, when the slide operation extends to the operator displayed in the peripheral area $R_{2D}$, the air flow of the air conditioner is reduced. The longer the duration of touch on the operator the more air flow is reduced.

The raise set temperature function allocated to the peripheral area $R_{2R}$ and the lower set temperature function allocated to the peripheral area $R_{2L}$ are paired functions of a function for changing the common set value to the plus side and a function for changing the common set value to the minus side. In addition, the raise air flow function allocated to the peripheral area $R_{2U}$ and the reduce air flow function allocated to the peripheral area $R_{2D}$ are paired functions of a function for changing the common set value to the plus side and a function for changing the common set value to the minus side.

In the air conditioner control application as well, by allocating paired functions to a peripheral area along the opposite side of the screen 138, the user can more intuitively change the set value of the function.

In this manner, the CPU 100A operating as the function executing unit 100d allocates different functions to the peripheral areas of the screen 138 for each application 106. Therefore, the function executed by the function executing unit 100d is switched according to the application 106 being executed.

The aforementioned is a description of a typical embodiment of the present invention. Embodiments of the present invention are not limited to those described above, and various modifications are possible within a scope of the technical concept of the present invention. For example, embodiments and the like that are explicitly indicated by way of example in the specification or combinations of obvious embodiments and the like are also included, as appropriate, in the embodiments of the present application.

In the embodiment described above, the search range SA is set to a circle C for which radius is the length from the base point of the touch position TP to the current touch position TP, but the shape of the search range SA is not limited to a circle. For example, a range within a polygon (triangle, quadrangle, or the like) with the base point of the touch position TP as the center of gravity, or a range within a polygon with the base point and the current touch position TP as vertices set as the search range SA are also feasible.

REFERENCE NUMERALS USED IN THE DRAWINGS

1. Information processing device
100. Controller
100A. CPU
1008. RAM
100C. ROM
100D. Input/output port
100a. Touch detection unit
100b. Function allocating unit
100c. Operator display unit
100d. Function executing unit
102. Program
104. Program
106. Application
110. Communication interface unit
120. Operation unit
130. Display unit
140. Audio output unit
150. Vibrating unit

What is claimed is:

1. An information processing device, comprising:
a screen;
a touch panel; and
a central processing unit (CPU) that is configured to:
allocate a first function to a first peripheral area that is located inside the screen and borders an edge of a first side of the screen and allocate a second function to a second peripheral area that is located inside the screen and borders an edge of a second side of the screen, wherein each of the first peripheral area and the second peripheral area is allocated a single function at a time;
detect touch operation of a user on the screen;
in response to detection of a slide operation that is in a direction of the first or second peripheral area and enters a first or second triangular area outside of the first or second peripheral area, display a single operator in the peripheral area that is located in the direction of the detected slide operation, wherein the single operator is configured to execute the single function at a time that is allocated to that peripheral area in response to touch operation of the user; and
in response to detection of a slide operation from outside the first or second peripheral area to inside the first or second peripheral area, implement the single function at a time that is allocated to the peripheral area that is a slide operation destination, wherein the slide operation destination is based on the touch operation in the peripheral area that is the destination of the detected touch operation.

2. The information processing device according to claim 1, wherein the central processing unit (CPU) includes a function executing unit that executes the single function at a time according to a touch operation on the operator.

3. The information processing device according to claim 1, wherein the central processing unit (CPU) includes a function executing unit that controls the settings value of the single function at a time according to the touch operation duration on the operator.

4. The information processing device according to claim 3, wherein:
at least one of the first and second peripheral areas is divided into a plurality of areas including a first divided area and a second divided area that is farther from the center of the screen than the first divided area, and
when the function executing unit detects touch operation for a first duration on the second divided area, the settings value of the single function at a time is changed more significantly than when the case touch operation is detected for the first duration on the first divided area.

5. The information processing device according to claim 1, wherein the first side is the opposite side of the second side and the first function is a paired function of the second function.

6. The information processing device according to claim 1, wherein:
execution can be switched among a plurality of applications,
the central processing unit (CPU) includes a function allocating unit that allocates different functions to the peripheral areas for each application, and
the function executed by the function executing unit is switched based on the application being executed.

7. A non-transitory, computer-readable medium having stored thereon a computer program that, when executed by an electronic processor of an information processing device, configures the information processing device to:
allocate a first function to a first peripheral area that is located inside a screen and bordering an edge of a first side of the screen;
allocate a second function to a second peripheral area that is located inside the screen and bordering an edge of a second side of the screen, wherein each of the first peripheral area and the second peripheral area is allocated a single function at a time;
detect touch operation of a user on the screen;
in response to detection of a slide operation that is in a direction of the first or second peripheral area and enters a first or second triangular area outside of the first or second peripheral area, display a single operator in the first or second peripheral area based on a direction of a slide operation, wherein the single operator is configured to execute the single function at a time that is allocated to that peripheral area in response to touch operation of the user; and
execute the single function at a time allocated to the peripheral area that is a slide operation destination when slide operation from outside the peripheral area to inside the peripheral area is detected, based on touch operation in the peripheral area that is the destination of the detected slide operation.

* * * * *